March 7, 1944.   H. L. ROSE   2,343,244
MECHANICAL MOVEMENT
Filed July 20, 1942
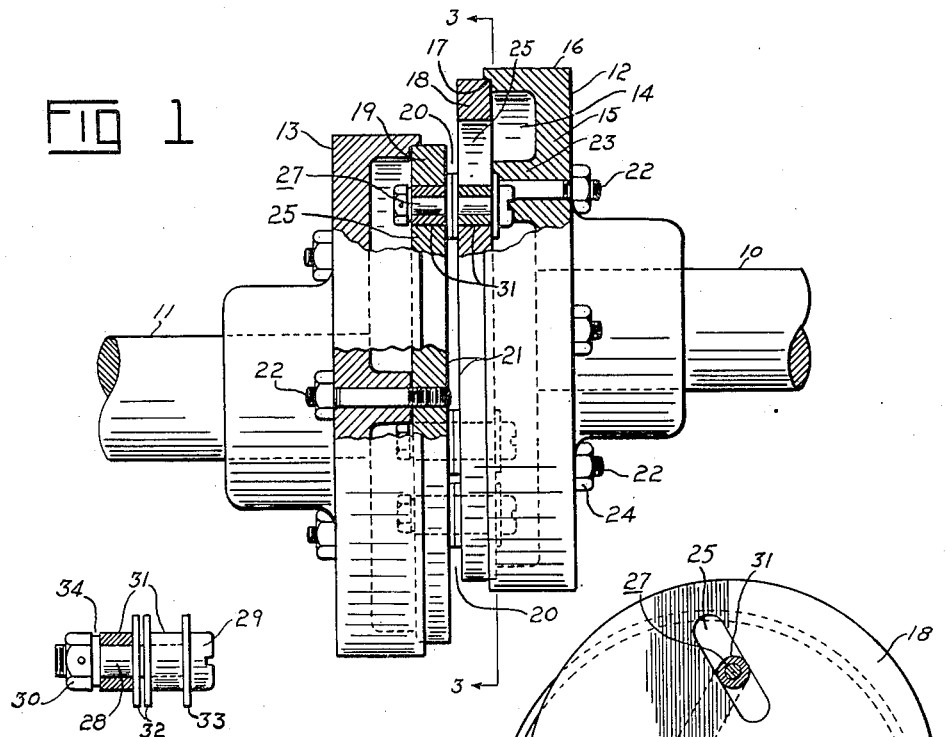
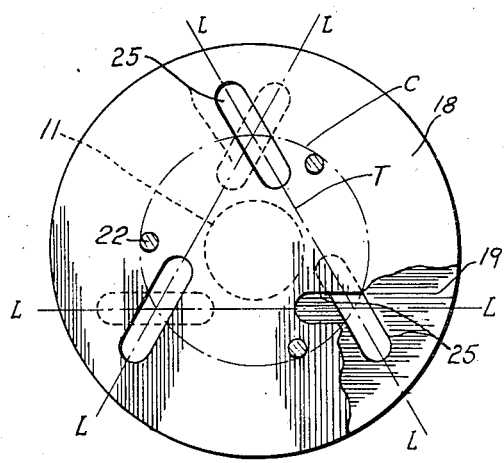
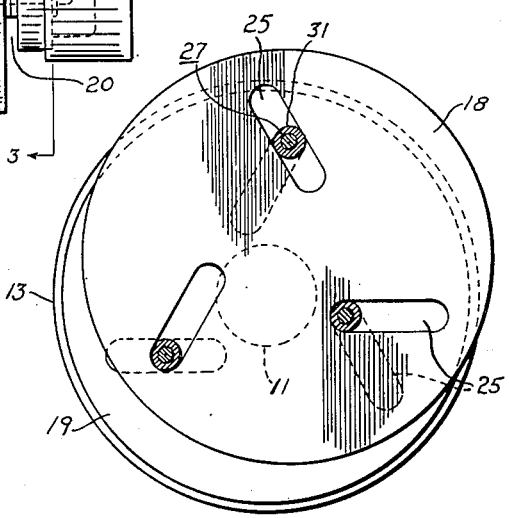
Inventor
HENRY LASENBY ROSE
Attorney Patented Mar. 7, 1944

2,343,244

UNITED STATES PATENT OFFICE 2,343,244

MECHANICAL MOVEMENT

Henry Lasenby Rose, Burlington, Ontario, Canada

Application July 20, 1942, Serial No. 451,637
In Canada June 29, 1942

4 Claims. (Cl. 64—31)

This invention relates to a mechanical movement.

The mechanical movement of the present invention is primarily intended for shafting and the like, where, for instance, two shafts are to be operatively connected or coupled together in parallel but non-co-axial, or spaced relationship so that both shafts will operate as a single line of shafting.

The objects of the invention are to provide a coupling whereby one rotatable object may drive another rotatable object when the longitudinal axes of both objects are parallel but non-co-axial.

Thus, a rotating shaft, for instance, will rotate another shaft even if their respective longitudinal axes are not co-axial.

As will be evident, the mechanical movement of the present invention may take the form of two shafts journalled in parallelism but capable of relative movement to vary their relative offset spacing, one shaft driving the other.

In the drawing, wherein like numerals of reference indicate corresponding parts in the various figures, Figure 1 is a side elevation of two shafts coupled together in accordance with the present invention, such arrangement of parts as shown being illustrative of one form of the means capable of realizing the mechanical movement of the invention, parts being broken away;

Figure 2 is a side elevation of one of the coupling elements shown in Figure 1, parts being broken away;

Figure 3 is a more or less diagrammatic view on about line 3—3 in Figure 1; and

Figure 4 is a view similar to Figure 3 but with the shafts in co-axial relationship, parts being broken away.

Referring now by numerals to the drawing, 10 and 11 indicate two shafts which are suitably journalled in parallel but spaced or offset relationship. To the spaced, adjacent ends of the shafts 10 and 11, are rigidly secured members 12 and 13, respectively. Conveniently, the members 12 and 13 are circular in form and are recessed or cupped on their outer faces, as at 14, and include a wall 15 and a peripheral wall or flange 16 the end of which is recessed to define a shoulder 17.

Secured to the members 12 and 13, and seated on the shoulders 17, are discs or plates 18 and 19, respectively.

The arrangement is such that a clearance is provided as at 20, between the adjacent, parallel faces 21 of the discs when secured to their respective supporting members 12 and 13. The arrangement is also such that the faces 21 are at right angles to the axes of the shafts.

Conveniently, the disc 18 may be secured to its associated or supporting member 12 as by studs 22 inserted through bosses 23 formed on the member and threaded at one end into the disc, and receiving at the other end a nut 24. The disc 19 may be similarly secured to its associated member 13.

The discs 18 and 19 are similarly formed, and each includes a number of elongated recesses, or more particularly slots 25, of which three are shown. The opposite ends of the slots are preferably defined by semicircles the diameter of which is equal to the width of the slot.

The slots 25 are evenly spaced circumferentially of the disc, and are also successively similarly disposed with respect to the centre of the disc. This is to say, a circle C having as its centre, the centre of the disc, would intersect the longitudinal axis L—L of each slot at mid-length thereof, and the points of intersection of the circle with the axes of all three slots would define the corners of an equilateral triangle T, the three sides of which would lie in the longitudinal axes of all three slots, respectively.

While both discs 18 and 19 are similarly formed, as aforesaid, they are secured to their associated members 12 and 13, respectively, in reversed relationship so that, as best shown in Figure 4, the slots in one disc are angularly disposed or directed with respect to the slots in the other disc.

To impart rotation to, say the disc 19 (and therefore to the shaft 11), by the rotation of the disc 18 (and therefore the shaft 10), coupling elements, such as pins or rollers 27, may be used. The pin or roller, shown in Figure 2, may comprise a bolt 28 having a head 29 and nut 30. Journalled on the shank of the bolt are two tubular members or sleeves 31 held in spaced-apart relationship by a pair of washers 32. A washer 33 is used between the head 29 and the adjacent end of the adjacent sleeve 31. A washer 34 is preferably used between the nut 30 and the adjacent end of the adjacent sleeve 31. The washers 32 and 33 are of a diameter larger than the width of the slot 25, so that the pin or roller 27, as a coupling element or unit, is retained in the discs 18 and 19, while being free to slide in the slots.

If the shafts 10 and 11 are not co-axial but in spaced relationship, as shown in Figure 1, the coupling elements 27 will move back and forth in their associated slots, as one shaft, say the driving shaft, is rotated to impart rotation to the other, or driven shaft.

While, as shown, three slots 25 and three pins 27 are used as the recommended minimum number, their number may be increased within the capacity of the disc to accommodate, but the device would not operate with four such slots since the slots in one disc would then be at right angles with the slots in the other disc.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

I claim:

1. In combination a pair of shafts, said shafts having adjacent ends, a disc fixed on the adjacent end of each shaft having slots therein extending from the central portion of the disc outwardly toward the rim of the disc, the slots on one disc intersecting the slots on the other disc at an acute angle, and pins extending through the intersecting slots.

2. In combination a pair of shafts, said shafts having adjacent ends, a disc fixed on the adjacent end of each shaft having slots therein extending from the central portion of the disc outwardly toward the rim of the disc, the slots on one disc intersecting the slots on the other disc at an acute angle, and pins extending through the intersecting slots, the slots in each disc having the longitudinal axes parallel to and spaced from radial lines extending from the centers of said discs.

3. In combination a pair of shafts, said shafts having adjacent ends, a disc fixed on the adjacent end of each shaft having slots therein extending from the central portion of the disc outwardly toward the rim of the disc, the slots on one disc intersecting the slots on the other disc at an acute angle, pins extending through the intersecting slots, the slots in each disc being at least three in number and symmetrically spaced on opposite sides of the disc, and means on said shafts to hold said pins from movement out of said slots.

4. In combination a pair of shafts, said shafts having adjacent ends, a disc fixed on the adjacent end of each shaft having slots therein extending from the central portion of the disc outwardly toward the rim of the disc, the slots on one disc intersecting the slots on the other disc at an acute angle, pins extending through the intersecting slots, the slots in each disc having the longitudinal axes parallel to and spaced from radial lines extending from the centers of said discs, and means on said shafts to hold said pins from movement out of said slots.

HENRY LASENBY ROSE.